US009932036B1

(12) United States Patent
Kurata

(10) Patent No.: US 9,932,036 B1
(45) Date of Patent: Apr. 3, 2018

(54) DRIVING ASSISTANCE DEVICE

(71) Applicant: SUZUKI MOTOR CORPORATION, Hamamatsu-shi, Shizuoka (JP)

(72) Inventor: Koji Kurata, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/671,839

(22) Filed: Aug. 8, 2017

(30) Foreign Application Priority Data

Sep. 13, 2016 (JP) .................................. 2016-178673

(51) Int. Cl.
*B60W 30/14* (2006.01)
*B60K 31/00* (2006.01)
*B60T 7/12* (2006.01)

(52) U.S. Cl.
CPC ....... *B60W 30/143* (2013.01); *B60K 31/0008* (2013.01); *B60T 7/12* (2013.01); *B60K 2031/0025* (2013.01); *B60W 2550/10* (2013.01); *B60W 2550/141* (2013.01); *B60W 2710/0616* (2013.01); *B60W 2710/18* (2013.01)

(58) Field of Classification Search
CPC .. B60W 30/143; B60W 30/14; B60W 30/146; B60W 30/16; B60W 30/162; B60W 2550/10; B60W 2550/12; B60W 2550/141; B60K 2031/0025–2031/0041
See application file for complete search history.

(56) References Cited

U.S. PATENT DOCUMENTS

| 9,817,399 B2 * | 11/2017 | Braunstein | ........... G05D 1/0088 |
| 2007/0198136 A1 * | 8/2007 | Kobayashi | ........... B60K 26/021 701/1 |
| 2009/0260904 A1 * | 10/2009 | Kojima | ..................... B60K 6/46 180/65.275 |
| 2010/0204896 A1 * | 8/2010 | Biondo | ............... B60W 30/143 701/93 |
| 2014/0074370 A1 * | 3/2014 | Johansson | ........ B60W 50/0097 701/93 |
| 2016/0339959 A1 * | 11/2016 | Lee | .................... B62D 15/0265 |
| 2017/0015313 A1 * | 1/2017 | Mei | ....................... B60W 30/09 |
| 2017/0113696 A1 * | 4/2017 | Oh | ................. B60W 30/18163 |
| 2017/0341648 A1 * | 11/2017 | Sanma | ................. B60W 30/14 |
| 2018/0025632 A1 * | 1/2018 | Breed | ................. G08G 1/0129 |

FOREIGN PATENT DOCUMENTS

JP          H 10-81156 A          3/1998

* cited by examiner

*Primary Examiner* — Erez Gurari
(74) *Attorney, Agent, or Firm* — Stein IP, LLC

(57) ABSTRACT

There is provided a driving assistance device. When there is a possibility that weather influences a detection performance of a vehicle detection unit configured to detect a preceding vehicle traveling in front of a subject vehicle and to measure an inter-vehicular distance to the preceding vehicle, a speed reduction control assistance unit enables a speed reduction control unit to perform a primary speed reduction control at a predetermined distance ahead of an entry or an exit of a tunnel-shaped road structure. Thereafter, when the vehicle detection unit detects the preceding vehicle and the inter-vehicular distance is equal to or smaller than a predetermined value, the speed reduction control assistance unit enables the speed reduction control unit to perform a secondary speed reduction control.

6 Claims, 8 Drawing Sheets

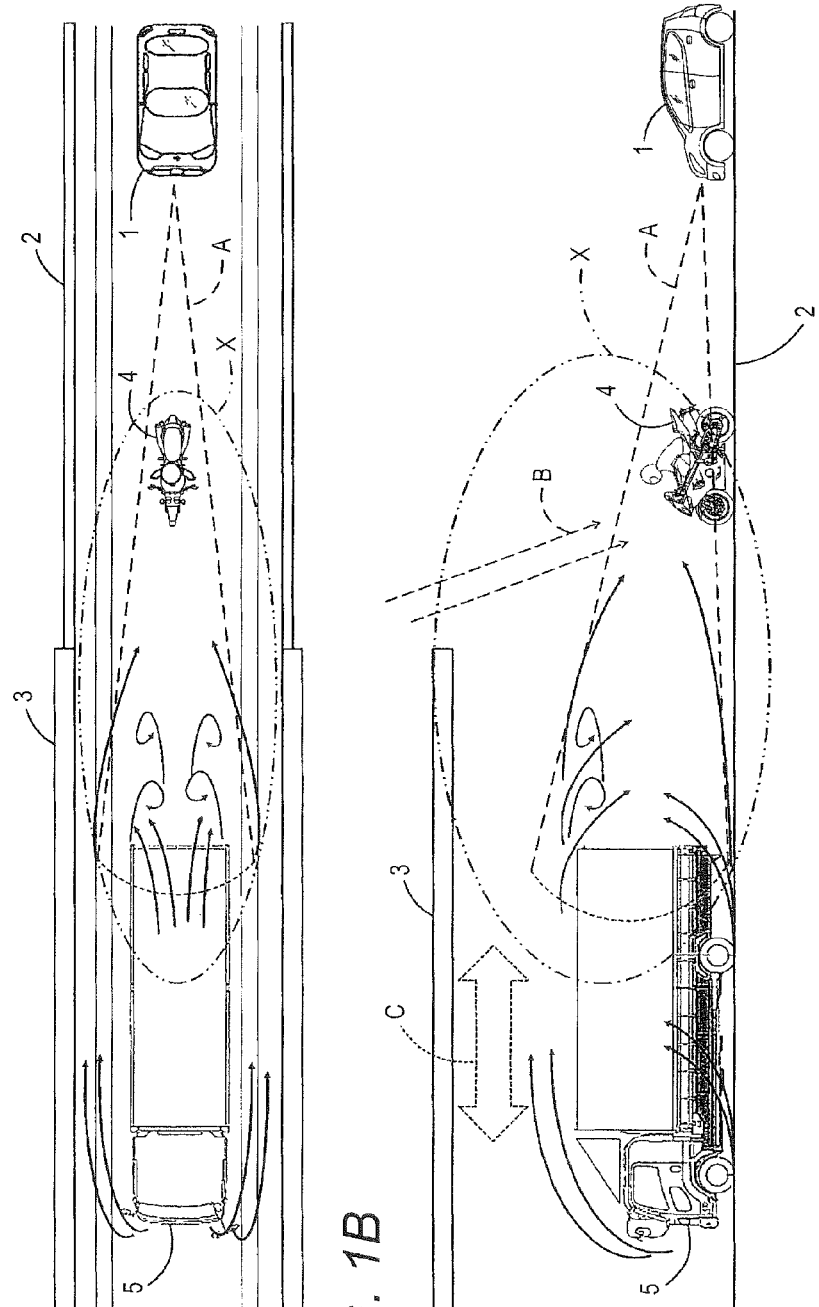

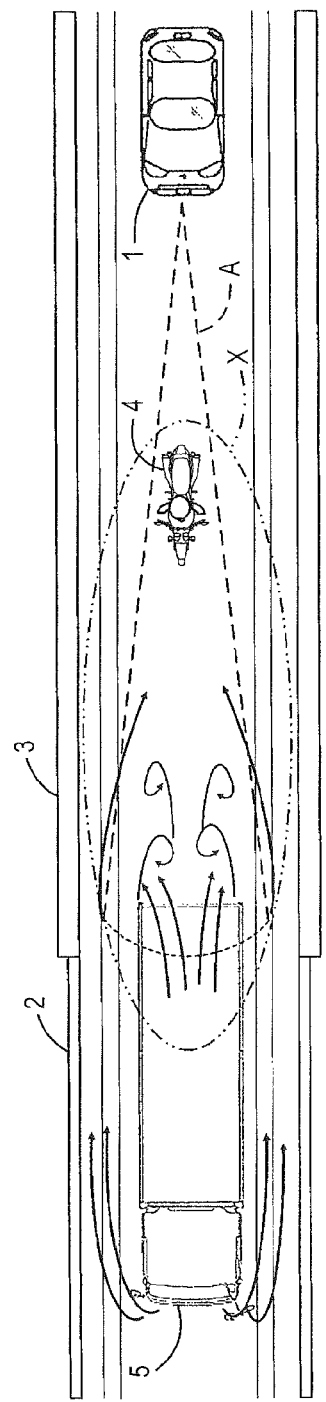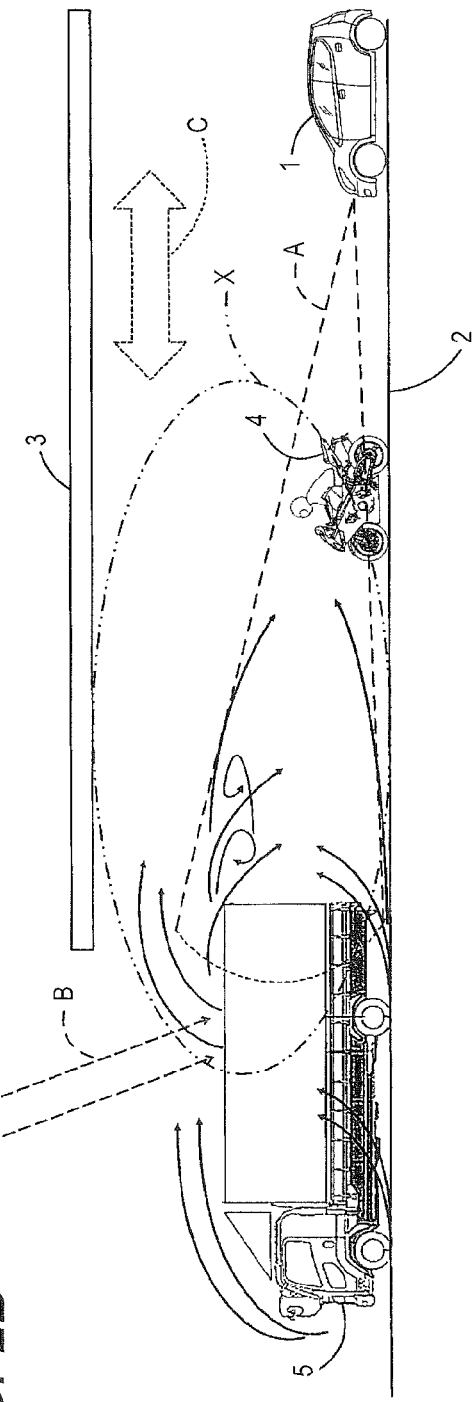
FIG. 2A
FIG. 2B

DRIVING ASSISTANCE DEVICE

CROSS-REFERENCE TO RELATED APPLICATIONS

The disclosure of Japanese Patent Application No. 2016-178673 filed on Sep. 13, 2016, including specification, drawings and claims is incorporated herein by reference in its entirety.

TECHNICAL FIELD

The disclosure relates to a driving assistance device.

BACKGROUND

In the related art, regarding an automatic four-wheeled vehicle, a driving assistance system configured to control a traveling speed of a subject vehicle so as to secure an inter-vehicular distance between the subject vehicle and a preceding vehicle traveling in front of the subject vehicle has been suggested.

When detecting the preceding vehicle by means of a radar, detection performance of the radar is lowered under bad weathers such as heavy rain, dense fog and the like. As a result, it is determined that there is no preceding vehicle, so that speed reduction control is delayed and a passenger should resultantly operate a brake. In order to solve the problem, a technology of providing a rainfall amount detection unit configured to detect an amount of rainfall and stopping the inter-vehicular distance control when a detected rainfall amount value is equal to or greater than a predetermined value has been suggested (for example, refer to Patent Document 1).

Patent Document 1: Japanese Patent Application Publication No. H10-081156A

In the vicinity of a gateway of a tunnel, a flow of wind is complicated due to an influence of the wind moving in the tunnel. For this reason, since raindrops, fog and the like move intricately, the detection environments of the radar are temporarily deteriorated, so that the detection performance of the radar is temporarily lowered. As a result, a phenomenon that the preceding vehicle is late detected or is temporarily missed occurs.

When the speed of the subject vehicle is high, even the phenomenon for an extremely slight time period highly exerts a bad influence on a driving assistance. The detection delay and the temporary missing cause a rapid operation of an automatic brake to deteriorate a ride quality, cause a bad influence on a following vehicle, such as a harsh braking, and become an origination of a traffic jam.

The above phenomena become conspicuous when the preceding vehicle is a small-sized vehicle, particularly, a saddle-ridden vehicle.

Patent Document 1 does not disclose the temporary deterioration of the detection environments of the radar in the vicinity of the gateway of the tunnel.

SUMMARY

It is therefore an object of the disclosure to provide a driving assistance device capable of improving a ride quality of a subject vehicle in the vicinity of a gateway of a tunnel and the like and reducing a bad influence on a following vehicle even under a bad weather and the like.

According to an aspect of the embodiments of the present invention, there is provided a driving assistance device configured to reduce a speed of a subject vehicle on the basis of an output of a vehicle detection unit which is configured to detect a preceding vehicle traveling in front of the subject vehicle and to measure an inter-vehicular distance between the subject vehicle and the preceding vehicle, the driving assistance device comprising: a speed reduction control unit configured to perform a speed reduction control for the subject vehicle; and a speed reduction control assistance unit configured to enable the speed reduction control unit to perform the speed reduction control, wherein when there is a possibility that weather in a surrounding of the subject vehicle influences a detection performance of the vehicle detection unit, the speed reduction control assistance unit enables the speed reduction control unit to perform a primary speed reduction control at a predetermined distance ahead of an entry or an exit of a tunnel-shaped road structure on the basis of information about a position of the subject vehicle and a road structure on a traveling road on which the subject vehicle travels, and thereafter, when the vehicle detection unit detects the preceding vehicle and the inter-vehicular distance is equal to or smaller than a predetermined value, the speed reduction control assistance unit enables the speed reduction control unit to perform a secondary speed reduction control.

According to the disclosure, it is possible to improve the ride quality of the subject vehicle in the vicinity of the gateway of the tunnel and the like and reducing the bad influence on the following vehicle even under the bad weather and the like.

BRIEF DESCRIPTION OF THE DRAWINGS

In the accompanying drawings:

FIGS. 1A and 1B are pictorial views depicting a relation between a subject vehicle and other detection target in the vicinity of an entry of a tunnel;

FIGS. 2A and 2B are pictorial views depicting a relation between the subject vehicle and other detection target in the vicinity of an exit of the tunnel;

DETAILED DESCRIPTION OF THE EMBODIMENTS

Figure 3:
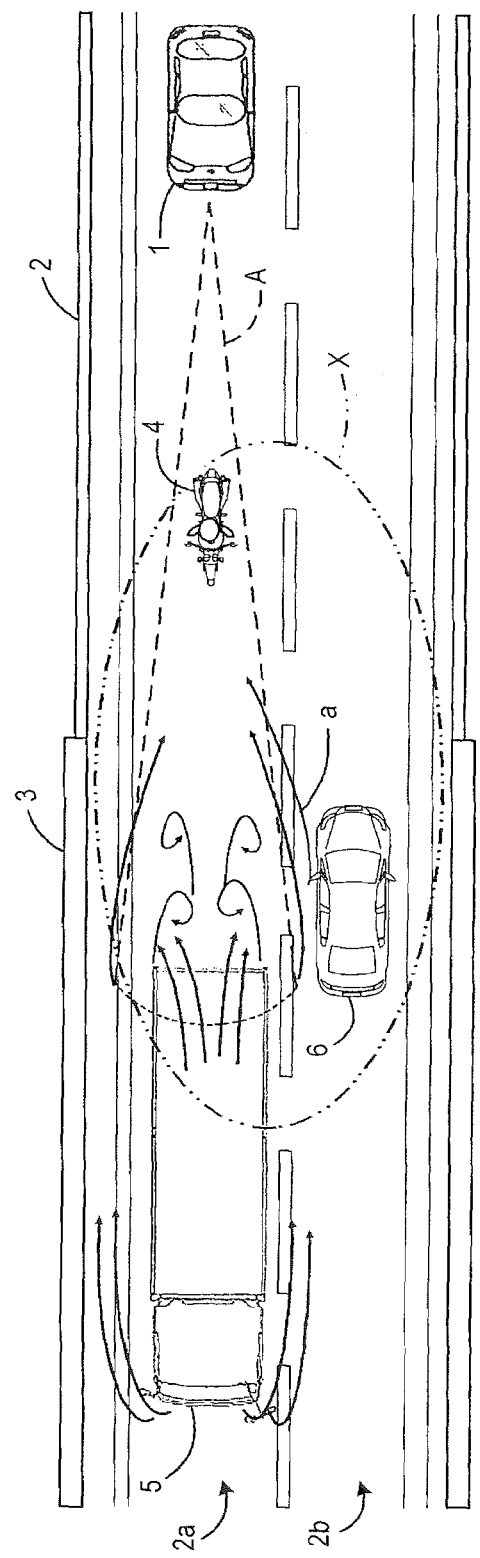
FIG. 3 is a pictorial view depicting a relation between the subject vehicle and other detection target in the vicinity of the entry of the tunnel in which a road is passable on both sides.

Hereinafter, an illustrative embodiment of the disclosure will be described in detail with reference to the accompanying drawings. Meanwhile, in below descriptions, an example where a driving assistance device of the disclosure is applied to an automatic four-wheeled vehicle of an automatic driving type will be described. However, the target to be applied is not limited thereto and can be changed. For example, the driving assistance device of the disclosure can also be applied to a vehicle of other type (for example, a saddle-ridden vehicle such as an automatic three-wheeled vehicle).

In the meantime, the disclosure can also be effectively applied to a manual driving-type vehicle, not the automatic driving type. Specifically, a case where a driver is in an inattentive driving state (a state where attentiveness is lower than usual) due to fatigue or the like can be exemplified. In the inattentive driving state, since a subject of vehicle control with a preceding vehicle during the driving relies on a driving assistance device mounted on the subject vehicle, not the driver, in many cases, the disclosure can be effectively applied.

A problem in a tunnel to which the driving assistance device of the illustrative embodiment is to be applied is described with reference to FIGS. 1A to 4. FIGS. 1A and 1B are pictorial views depicting a relation between a subject vehicle and other detection target in the vicinity of an entry of a tunnel. FIG. 1A is a top view, as seen from above of a subject vehicle 1, and FIG. 1B is a side view, as seen from a side of the subject vehicle 1. As shown in FIGS. 1A and 1B, a tunnel 3 exists in front of a road 2 on which the subject vehicle 1 is traveling. Also, a motorcycle 4, which is an example of the saddle-ridden vehicle, is traveling in front of the subject vehicle 1. A large truck 5, which is an example of the large-sized vehicle, is traveling in front of the motorcycle 4.

In FIGS. 1A and 1B, a broken line A indicates a radar illumination range of a millimeter wave radar (which will be described later), which is provided on a front surface of the subject vehicle 1 and is an example of the vehicle detection unit.

Also, in FIGS. 1A and 1B, an arrow shown with a solid line around the large truck 5 indicates a flow of wind that is generated by the large truck 5. Also, in FIG. 1B, an arrow B shown with a broken line indicates rain at the entry-side of the tunnel 3. Also, an arrow C shown with a dotted line indicates a flow of wind that is generated in the tunnel 3.

As shown in FIGS. 1A and 1B, in the vicinity of the entry of the tunnel 3, a complicated flow of wind is generated around the large truck 5 in front of the subject vehicle 1. For example, when a front part of the large truck 5 collides against the wind (the arrow C) blowing in the tunnel 3, a wind directed from the front part towards an upper side of a roof of a cargo compartment of the large truck 5 is generated. Also, a wind that curls up from a road surface of the road 2 and blows rearwards when tires of the large truck 5 rotate is generated. Also, at the rear part of the large truck 5, the wind blows from a ceiling of the cargo compartment towards a rear surface part-side thereof, thereby generating a turbulence flow.

When it rains heavily (the arrow B) at the state where the complicated flows of winds are generated, for example, numberless raindrops move with being intricately disturbed on the wind in a range X denoted with the dashed-two dotted line in FIGS. 1A and 1B. Also, the wind, curling up from the tires of the large truck 5 curls up the water from the road surface of the road 2, so that the raindrops become denser.

The detection environments by a millimeter wave radar in the range X are likely to be deteriorated, as compared to the road 2 except for the vicinity of the gateway of the tunnel 3. In the detection environments, a possibility that a vehicle detection unit, for which the millimeter wave radar is used, will overlook or miss the motorcycle 4 traveling between the subject vehicle 1 and the large truck 5 increases.

FIGS. 2A and 2B are pictorial views depicting a relation between the subject vehicle 1 and other detection target in the vicinity of an exit of the tunnel 3. FIG. 2A is a top view, as seen from above of the subject vehicle 1, and FIG. 2B is a side view, as seen from a side of the subject vehicle 1. The same configurations as FIGS. 1A and 1B are denoted with the same reference numerals, and the descriptions thereof are omitted.

As shown in FIGS. 2A and 2B, in the vicinity of the exit of the tunnel 3, a complicated flow of wind is generated around the large truck 5 in front of the subject vehicle 1. For example, a wind directed from the front part of the large truck 5 towards the upper side of the roof of the cargo compartment of the large truck 5 is generated. Also, a wind that curls up from the road surface of the road 2 and blows rearwards when the tires of the large truck 5 rotate is generated. Further, at the rear part of the large truck 5, the wind blows from the ceiling of the cargo compartment towards the rear surface part-side thereof, thereby generating a turbulence flow. The turbulence flow is further complicated due to the wind (the arrow C) blowing in the tunnel 3.

When it rains heavily (the arrow B) at the state where the complicated flows of winds are generated, for example, numberless raindrops move with being intricately disturbed on the wind in the range X denoted with the dashed-two dotted line in FIGS. 2A and 2B. Also, the wind curling up from the tires of the large truck 5 curls up the water from the road surface of the road 2, so that the raindrops become denser. Furthermore, the raindrops having collided with the roof of the large truck 5 blow towards the rear of the large truck 5 on the wind, so that the raindrops become further denser.

The detection environments by the millimeter wave radar in the range X are likely to be deteriorated, as compared to the road 2 except for the vicinity of the gateway of the tunnel 3. In the detection environments, there is a possibility that the vehicle detection unit, for which the millimeter wave radar is used, will miss the motorcycle 4 traveling between the subject vehicle 1 and the large truck 5.

Figure 4:
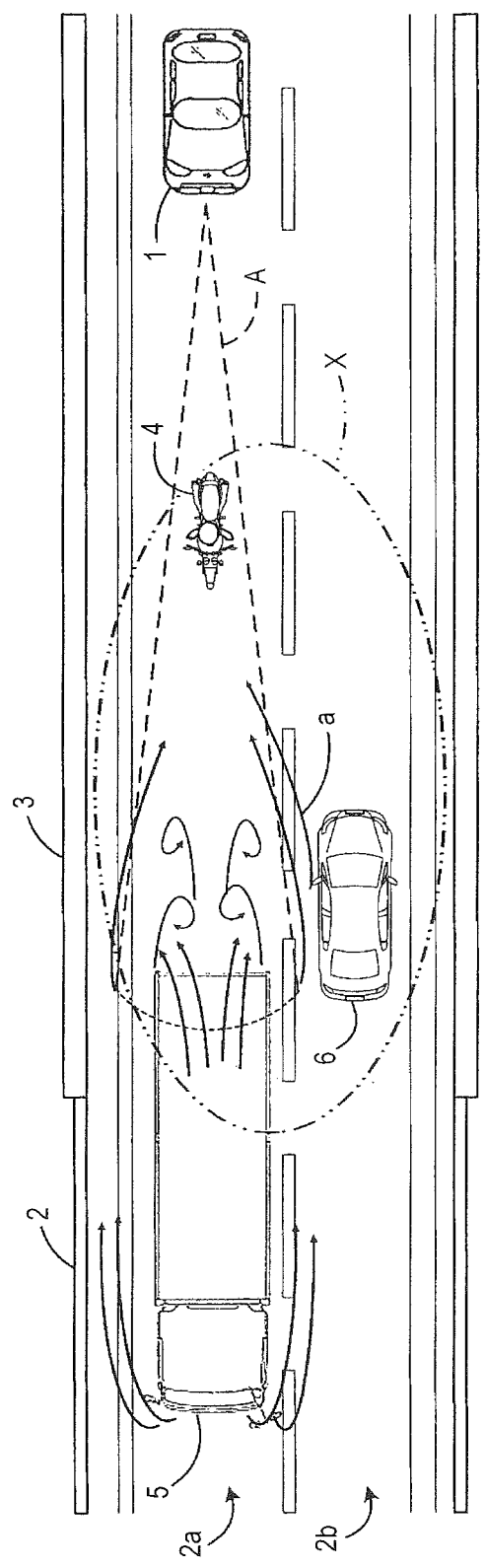
FIG. 4 is a pictorial view depicting a relation between the subject vehicle and other detection target in the vicinity of the exit of the tunnel in which a road is passable on both sides.

In FIGS. 1A, 1B, 2A and 2B, the example where the road 2 is a one-way traffic has been described. When the road 2 is passable on both sides, the possibility that the detection environments will be further deteriorated due to an influence of an opposite vehicle increases. FIGS. 3 and 4 are pictorial views depicting a relation between the subject vehicle 1 and other detection target in the vicinity of the gateway of the tunnel 3 in which a road is passable on both sides.

As shown in FIGS. 3 and 4, in the vicinity of the gateway of the tunnel 3, the wind denoted with an arrow a blows from an opposite vehicle 6, which is traveling on an opposite lane 2b opposite to a lane 2a of the road 2 on which the subject vehicle 1 is traveling, towards the rear of the large truck 5. For this reason, the turbulence flow at the rear of the large truck 5 is further complicated, so that the detection environments by the millimeter wave radar in the range X are more likely to be deteriorated. In the detection environments, the possibility that the vehicle detection unit, for which the millimeter wave radar is used, will miss the motorcycle 4 traveling between the subject vehicle 1 and the large truck 5 increases.

As described above, when the large truck 5 travels in front of the subject vehicle 1, in the vicinity of the gateway of the tunnel 3, the detection environments of the vehicle detection unit of the subject vehicle 1, for example, the millimeter wave radar, are very poor, as compared to the fair weather. For this reason, there is a possibility that the detection of the small-sized vehicle, particularly, the motorcycle 4, which is an example of the saddle-ridden vehicle of which a reflection area of radar waves is small, will be delayed or the small-sized vehicle will be temporarily overlooked.

When the speed of the subject vehicle 1 is high, the situations change even in very little time. For example, when the subject vehicle 1 travels at speed of 100 km/H, the subject vehicle 1 moves forward about 28 m in one second. In this case, at the corresponding speed, when the motorcycle 4 in front of the subject vehicle 1 moves at low speed due to the traffic jam in the tunnel 3 (when the motorcycle has to travel at low speed on a sudden), for example, it is necessary to take measures against the detection (finding) delay and temporary missing.

As an example of the detection delay in the vicinity of the entry of the tunnel 3 as shown in FIGS. 1A, 1B and 3, a case where when the subject vehicle 1 catches up with the motorcycle 4 in front of the subject vehicle 1 in the vicinity of the entry of the tunnel 3, the vehicle detection unit of the subject vehicle 1 can detect the motorcycle 4 under normal circumstances but cannot detect the same due to the deterioration of the detection environments may be exemplified.

In this case, when the subject vehicle 1 enters the tunnel 3 and is not influenced by the bad weather outside the tunnel 3, the vehicle detection unit detects the motorcycle 4. Thus, the driving assistance device falsely recognizes that the motorcycle suddenly appears, and performs speed reduction control if a predetermined inter-vehicular distance is not secured, and the rapid speed reduction control is required, depending on the situations.

As an example of the temporary missing, as shown in FIGS. 1A and 1B, a case where when a large-sized vehicle such as the large truck 5 travels in front of the subject vehicle 1 and the motorcycle 4 travels at the rear of the large-sized vehicle and in front of the subject vehicle 1, the driving assistance device can normally detect the motorcycle 4 ahead of the entry of the tunnel 3 but the vehicle detection unit cannot detect the motorcycle 4 due to the temporary deterioration of the detection environments in the vicinity of the entry of the tunnel 3 may be exemplified.

In this case, since the subject vehicle 1 travels as if there were no the motorcycle 4 ahead of the subject vehicle even though the motorcycle 4 actually exists, the inter-vehicular distance between the subject vehicle 1 and the motorcycle 4 may not be sufficiently secured.

At this situation, when the subject vehicle 1 enters the tunnel 3 and is not influenced by the bad weather outside the tunnel 3, the vehicle detection unit again detects the motorcycle 4. Thus, the driving assistance device falsely recognizes that the motorcycle suddenly appears, and performs the speed reduction control if a predetermined inter-vehicular distance is not secured, and the rapid speed reduction control is required, depending on the situations.

In the meantime, in the vicinity of the exit of the tunnel 3 as shown in FIGS. 2A, 2B and 4, since the subject vehicle 1 is still in the tunnel 3, the subject vehicle is not directly influenced by the bad weather but is influenced by the raindrops blowing into the tunnel on the wind from the outside of the tunnel 3. For this reason, the detection environments are temporarily deteriorated, so that the vehicle detection unit may temporarily miss the motorcycle 4.

When the subject vehicle 1 goes out of the tunnel 3 and the detection environments are improved, the vehicle detection unit again detects the motorcycle 4. In this case, when the sufficient inter-vehicular distance between the subject vehicle 1 and the motorcycle 4 is not secured, the speed reduction control is performed in the subject vehicle and the rapid speed reduction control is required, depending on the situations.

The rapid speed reduction control in the vicinity of the gateway of the tunnel deteriorates a ride quality and exerts a bad influences on the following vehicle, so that it may become an origination of a traffic jam. As an example of the bad influence on the following vehicle, a case where the following vehicle is caused to make a hard stop when the inter-vehicular distance between the subject vehicle and the following vehicle is not sufficient may be exemplified.

In particular, when the subject vehicle 1 is an automatic driving vehicle, it is very important to improve the ride quality and to reduce the bad influence on the following vehicle.

Therefore, the inventors found that when there is a possibility that the detection of a preceding vehicle (the motorcycle 4) will be delayed or the preceding vehicle will be temporarily missed due to the bad weather in the vicinity of the gateway of the tunnel 3 (refer to FIGS. 1A to 4), if the subject vehicle 1 is enabled to once perform gentle speed reduction in advance and then to perform the speed reduction control in a stepwise manner, it is possible to avoid the harsh braking and to improve the ride quality, and conceived the disclosure.

That is, an aspect of the driving assistance device of the disclosure is a driving assistance device configured to reduce a speed of a subject vehicle on the basis of an output of a vehicle detection unit configured to detect a preceding vehicle traveling in front of the subject vehicle and to measure an inter-vehicular distance between the subject vehicle and the preceding vehicle. The driving assistance device includes a speed reduction control unit configured to perform speed reduction control for the subject vehicle, and a speed reduction control assistance unit that, when there is a possibility that a surrounding weather of the subject vehicle will influence detection performance of the vehicle detection unit, enables the speed reduction control unit to perform primary speed reduction control at a predetermined distance ahead of an entry or an exit of a tunnel-shaped road structure on the basis of information about a position of the subject vehicle and a road structure on a traveling road on which the subject vehicle travels, and then when the vehicle detection unit detects the preceding vehicle and the inter-vehicular distance is equal to or smaller than a predetermined value, enables the speed reduction control unit to perform secondary speed reduction control.

In an aspect of the driving assistance device of the disclosure, the subject vehicle is an automatic four-wheeled vehicle (including a mini vehicle, a large truck, a large bus and the like) or a saddle-ridden vehicle (including a motorcycle, an automatic three-wheeled vehicle and the like). The subject vehicle is an automatic driving vehicle configured to perform automatic driving on the basis of an output from the vehicle detection unit configured to detect the preceding vehicle.

In an aspect of the driving assistance device of the disclosure, the preceding vehicle is a vehicle that is likely to be overlooked in the detection, specifically, a small-sized vehicle including an automatic four-wheeled vehicle such as a mini vehicle and a sports car and a saddle-ridden vehicle. The saddle-ridden vehicle is a motorcycle or an automatic three-wheeled vehicle, for example. Since the saddle-ridden vehicle has a size smaller than the automatic four-wheeled vehicle, a reflection area of radar waves is small and movement is agile.

Also, in an aspect of the driving assistance device of the disclosure, the vehicle detection unit is a detection unit configured to use reflected waves, such as a millimeter wave radar, an infrared radar, an ultrasonic radar and the like and a camera such as a CCD camera, an infrared camera and the like. In the illustrative embodiment, the vehicle detection unit, for which the millimeter wave radar is used, is exemplified.

Also, in an aspect of the driving assistance device of the disclosure, the description "when there is a possibility that the surrounding weather of the subject vehicle will influence the detection performance of the vehicle detection unit" means a bad weather such as heavy rain, heavy snow, dense fog, smog and the like.

Also, in an aspect of the driving assistance device of the disclosure, the road structure indicates a structure that is built on the road or around the road. Also, the tunnel-shaped road structure indicates a space that is elongated in an axial direction, as compared to a height or a width of a section, such as the tunnel 3 (refer to FIGS. 1A to 4), i.e., a structure having a ceiling or walls higher than a vehicle and built at both sides of the vehicle. The tunnel-shaped structure includes a sidewall built along a road and a space surrounded by an elevated bridge (including a highway, a railroad and the like) located at a position higher than a road surface of the road, for example.

Also, in an aspect of the driving assistance device of the disclosure, the predetermined distance ahead of the entry or exit of the tunnel-shaped road structure indicates a distance within which the subject vehicle 1 under traveling can safely stop with respect to the motorcycle 4 (refer to FIGS. 1A, 1B, 2A and 2B) positioned at the entry or exit of the tunnel-shaped road structure. Herein, the safely stoppable distance may be a value determined on the basis of a traveling speed of the subject vehicle 1 or a value determined in consideration of relative speeds of the subject vehicle 1 and the motorcycle 4 while assuming that the motorcycle 4 is traveling.

According to an aspect of the driving assistance device of the disclosure, at a situation where the surrounding weather of the subject vehicle 1 such as a bad weather may influence the detection performance of the vehicle detection unit, in the vicinity of the gateway of the tunnel-shaped structure, after the speed of the subject vehicle 1 is reduced, when the detection environments are improved and the preceding vehicle is thus detected, it is possible to avoid the rapid speed reduction, as compared to a configuration where the brake control is performed in one step without performing the primary speed reduction control. As a result, it is possible to achieve the effects of improving the ride quality of the subject vehicle 1 and reducing the bad influence on the following vehicle.

In an aspect of the driving assistance device of the disclosure, a control amount of the primary speed reduction control is preferably less than a control amount of the secondary speed reduction control.

Also, in an aspect of the driving assistance device of the disclosure, preferably, the primary speed reduction control is fuel supply cut, and the secondary speed reduction control is brake control. The brake control indicates speed reduction that is to be performed using a brake device.

In this case, it is possible to approximate the ride quality of the subject vehicle 1 to the speed reduction control that is to be performed by a passenger, so that it is possible to achieve the effects of further improving the ride quality of the subject vehicle 1 and further reducing the bad influence on the following vehicle.

Also, in an aspect of the driving assistance device of the disclosure, the speed reduction control assistance unit preferably enables the speed reduction control unit to perform the primary speed reduction control and the secondary speed reduction control when the vehicle detection unit detects a large-sized vehicle at the entry-side of the tunnel 3. As shown in FIGS. 1A and 1B, even though the motorcycle 4 is traveling at the rear of the large truck 5, the vehicle detection unit may not detect the motorcycle 4 due to the deteriorated detection environments. For this reason, when the large-sized vehicle is detected, the primary speed reduction control of the subject vehicle 1 is performed in advance. Thereby, the speed reduction necessary to secure the safe inter-vehicular distance is performed in a stepwise manner, so that it is possible to avoid the rapid speed reduction when the motorcycle 4 is thereafter detected.

In the illustrative embodiment, the large-sized vehicle indicates a vehicle of which a vehicle height is higher than a saddle-ridden vehicle at a state where a passenger gets on the saddle-ridden vehicle such as the motorcycle 4, for example. In particular, the large-sized vehicle includes a vehicle that can easily blow off droplets and the like on a traveling wind towards the saddle-ridden vehicle from a luggage carrier, a cargo compartment and the like of a truck, one box car and the like.

Also, in an aspect of the driving assistance device of the disclosure, the speed reduction control assistance unit preferably enables the speed reduction control unit to perform the primary speed reduction control and the secondary speed reduction control when the vehicle detection unit detects the motorcycle 4 in the tunnel 3, at the exit-side of the tunnel 3 (refer to FIGS. 2A and 2B). Since the subject vehicle is not influenced by the bad weather in the tunnel 3, the vehicle detection unit of the subject vehicle 1 (refer to FIGS. 1A, 1B, 2A and 2B) can detect the motorcycle 4 but may temporarily miss the motorcycle 4 due to the influence of the bad weather in the vicinity of the exit of the tunnel 3. For this reason, the primary speed reduction control of the subject vehicle 1 is performed in advance. Thereby, the speed reduction necessary to secure the safe inter-vehicular distance is performed in a stepwise manner, so that it is possible to avoid the rapid speed reduction when the motorcycle 4 is thereafter detected.

Also, in an aspect of the driving assistance device of the disclosure, the driving assistance device preferably further includes a notification unit that notifies a deceleration state of the subject vehicle 1 to a following vehicle traveling at the rear of the subject vehicle 1 when the speed reduction control assistance unit enables the speed reduction control unit to perform the primary speed reduction control. Thereby, it is possible to get the attention of the following vehicle, so that it is possible to suppress the following vehicle from making a hard stop when the subject vehicle 1 performs the secondary speed reduction control.

Figure 5:
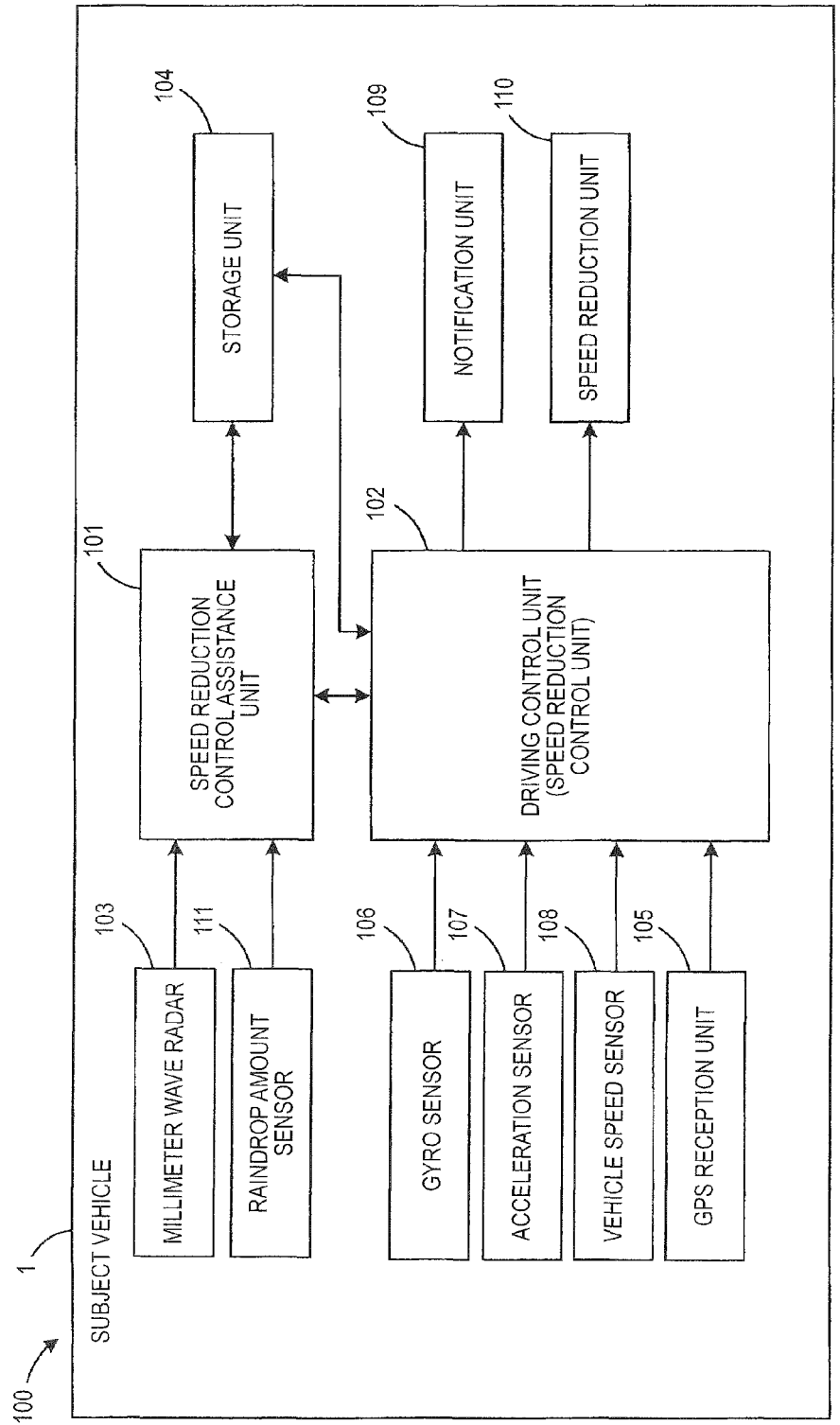
FIG. 5 is a schematic configuration view of a driving assistance device in accordance with an illustrative embodiment.

In the below, the illustrative embodiment of the disclosure is described in more detail with reference to the drawings. First, a configuration of a driving assistance device 100 of the illustrative embodiment is described. FIG. 5 is a schematic configuration view of a driving assistance device in accordance with the illustrative embodiment. Meanwhile, the subject vehicle 1 (refer to FIGS. 1A to 4) to which the driving assistance device 100 is applied has the configurations (an engine, tires and the like) that the automatic four-wheeled vehicle (the automatic driving vehicle) normally has, and the descriptions thereof are omitted. Also, in below descriptions, the preceding vehicle in front of the subject vehicle 1 is described as the motorcycle 4 (refer to FIGS. 1A to 4).

The driving assistance device 100 (refer to FIG. 5) of the illustrative embodiment includes a speed reduction control assistance unit 101, a driving control unit (the speed reduction control unit) 102 configured to control automatic driving of the subject vehicle 1, a millimeter wave radar 103, a storage unit 104, a GPS reception unit 105, a gyro sensor 106, an acceleration sensor 107, a vehicle speed sensor 108, a notification unit 109, a speed reduction unit 110 and a raindrop amount sensor 111.

The speed reduction control assistance unit 101 and the driving control unit 102 are provided in an ECU (Electronic Control Unit) and are configured by a processor configured to execute a variety of processing, for example.

The speed reduction control assistance unit 101 is configured to output, to the driving control unit 102, a determination result as to whether or not to reduce a speed of the subject vehicle 1 on the basis of an output from the millimeter wave radar 103, as driving assistance information.

The storage unit 104 is configured by one or more storage media such as a ROM (Read Only Memory), a RAM (Random Access Memory) and the like, depending on utilities. In the storage unit 104, information about the tunnel-shaped structure (which will be described later) is stored.

The millimeter wave radar 103, which is an example of the vehicle detection unit, is a radar system for front obstacle detection using radio waves in millimeter waveband. The millimeter wave radar 103 is provided at a front side of the subject vehicle 1 (refer to FIGS. 1A to 4), for example. The millimeter wave radar 103 is configured to illuminate millimeter wave radar ahead of the subject vehicle 1, to receive reflected waves reflected on a detection target by an antenna, to analyze the received reflected waves, to calculate an inter-vehicular distance between the subject vehicle and the preceding vehicle (the motorcycle 4), relative speeds, azimuth angles and a size of the detection target, and to output the same to the speed reduction control assistance unit 101.

The speed reduction control assistance unit 101 is configured to determine whether the inter-vehicular distance between the subject vehicle 1 and the preceding vehicle is equal to or smaller than a predetermined value, based on the inter-vehicular distance between the subject vehicle 1 and the preceding vehicle input from the millimeter wave radar 103, and to output a determination result thereof to the driving control unit 102, like a general driving assistance control device.

Meanwhile, the predetermined value in the corresponding determination indicates a distance within which the subject vehicle 1 (refer to FIGS. 1A to 4) under traveling can safely stop with respect to the preceding vehicle at a stop. Herein, the safely stoppable distance may be a value determined on the basis of a traveling speed of the subject vehicle 1 or a value determined in consideration of relative speeds (which can be measured by the millimeter wave radar 103) of the subject vehicle 1 and the preceding vehicle while assuming that the preceding vehicle (the motorcycle 4) is traveling.

Also, the speed reduction control assistance unit 101 is configured to determine whether a surrounding weather of the subject vehicle 1 may influence detection performance of the millimeter wave radar 103, based on an output of the raindrop amount sensor 111.

The raindrop amount sensor 111 is configured to measure and output an amount of raindrops attached to a front window of the subject vehicle 1, for example. The raindrop amount sensor 111 has a CCD camera, for example, and is configured to capture a predetermined range of a surface of the front window, to recognize and count raindrops from obtained image information and to output the counted value, as a measurement result.

The weather that may influence the detection performance of the millimeter wave radar 103 is a weather generally referred to as a bad weather or a heavy weather. The bad weather includes heavy rain, heavy snow, typhoon, dense fog, smog and the like.

The speed reduction control assistance unit 101 determines that it is a bad weather when the amount of raindrops measured by the raindrop amount sensor 111 is equal to or greater than a predetermined value. The bad weather may be determined by determining whether a cause of the raindrops is snow or not or whether the rain is strongly blowing due to a strong wind such as typhoon, in consideration of an output of a temperature sensor (not shown) or a wind-force sensor (not shown), for example.

In the illustrative embodiment, the raindrop amount sensor 111 is used. However, other sensors can also be used. Also, the example where the sensors are provided for the subject vehicle 1 has been described. However, the disclosure is not limited thereto. For example, a wireless communication unit (not shown) may be connected to the speed reduction control assistance unit 101, and information about a weather of a place in which the subject vehicle 1 is traveling may be received from an external device of the subject vehicle 1. The external device is a server connected to the Internet and a weather observation facility equipped in the vicinity of the road, for example.

Also, the speed reduction control assistance unit 101 is configured to calculate a distance from the entry or exit of the tunnel 3 to the subject vehicle 1 on the basis of a position of the subject vehicle 1 output from the GPS reception unit 105 and the information (which is stored in the storage unit 104) about the road structure on the road 2 on which the subject vehicle 1 travels.

Based on a calculation result, the speed reduction control assistance unit 101 is configured to determine whether the subject vehicle is ahead of the predetermined distance from the entry or exit of the tunnel 3.

The information about the road structure is information (coordinates and the like) about a position of the road structure included in map data including the road structure, for example.

The driving control unit 102 is configured to mainly execute the automatic driving control of the subject vehicle 1, and to accelerate, decelerate and steer the subject vehicle 1 on the basis of outputs from the GPS reception unit 105, the gyro sensor 106, the acceleration sensor 107 and the vehicle speed sensor 108 and the map data stored in the storage unit.

The driving control unit 102 is configured to function as the speed reduction control unit for enabling the speed reduction unit 110 to reduce the speed of the subject vehicle 1 in accordance with a determination result from the speed reduction control assistance unit 101.

The driving control unit 102 is configured to enable the notification unit 109 to issue a notification in accordance with an output from the speed reduction control assistance unit 101.

The notification unit 109 is to notify a deceleration state of the subject vehicle 1 to the following vehicle (not shown), which travels at the rear of the subject vehicle 1 (refer to FIGS. 1A to 4). The notification unit 109 is a tail lamp of the subject vehicle 1, for example, but is not particularly limited.

The speed reduction unit 110 is to reduce the speed of the subject vehicle 1. As the speed reduction unit 110, a brake device configured to brake rotations of wheels may be exemplified. In the meantime, the speed reduction unit 110 is not limited to the brake device that is to be operated in accordance with a direct operation of a driver and includes a unit that is to be automatically controlled by the ECU or the like, such as a regeneration brake of a hybrid vehicle or an electric car, an engine brake associated with shift transmission, and the like.

Also, the driving control unit 102 is configured to input an output from the GPS reception unit 105 to the speed reduction control assistance unit 101. The subject vehicle position information from the GPS reception unit 105 is used to determine whether the subject vehicle 1 is in the tunnel 3, in ST101 of FIG. 6 (which will be described later).

Figure 6:
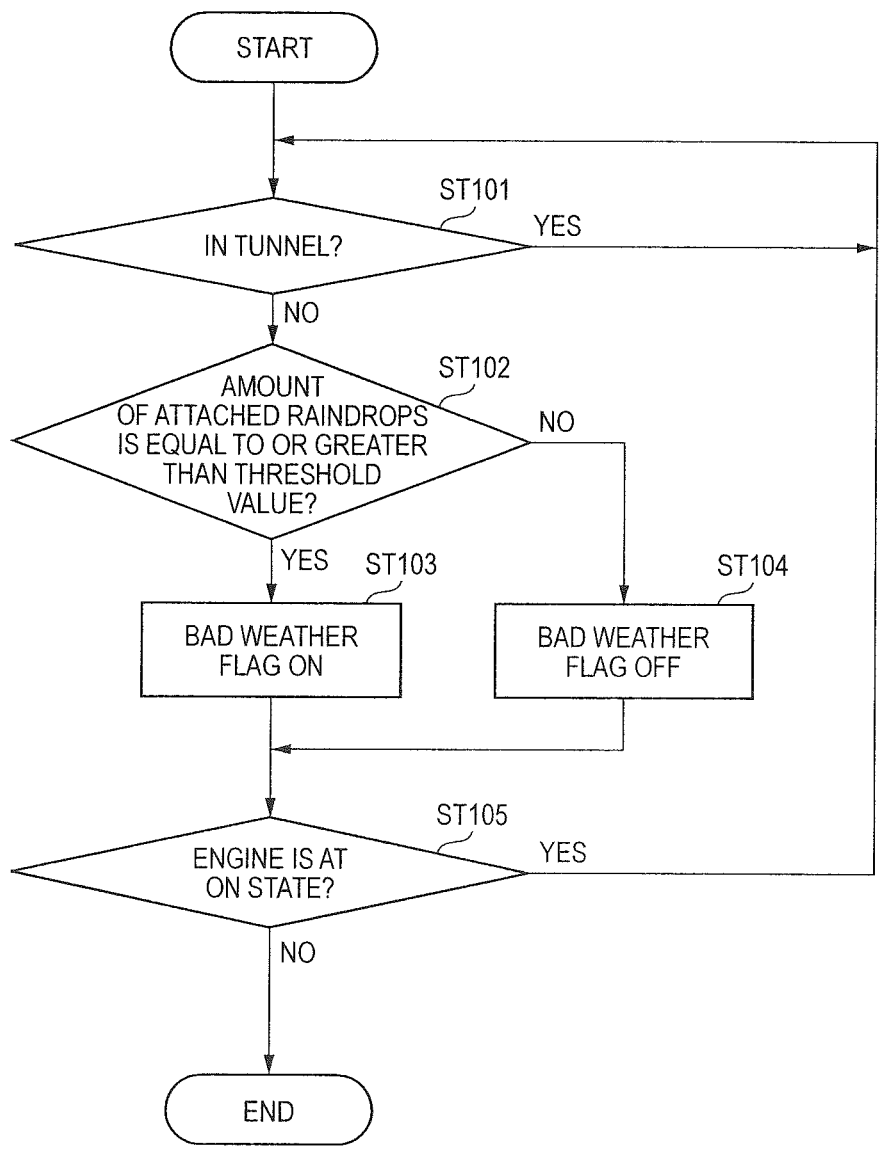
FIG. 6 is a control flow of the driving assistance device in accordance with the illustrative embodiment.
Figure 7:
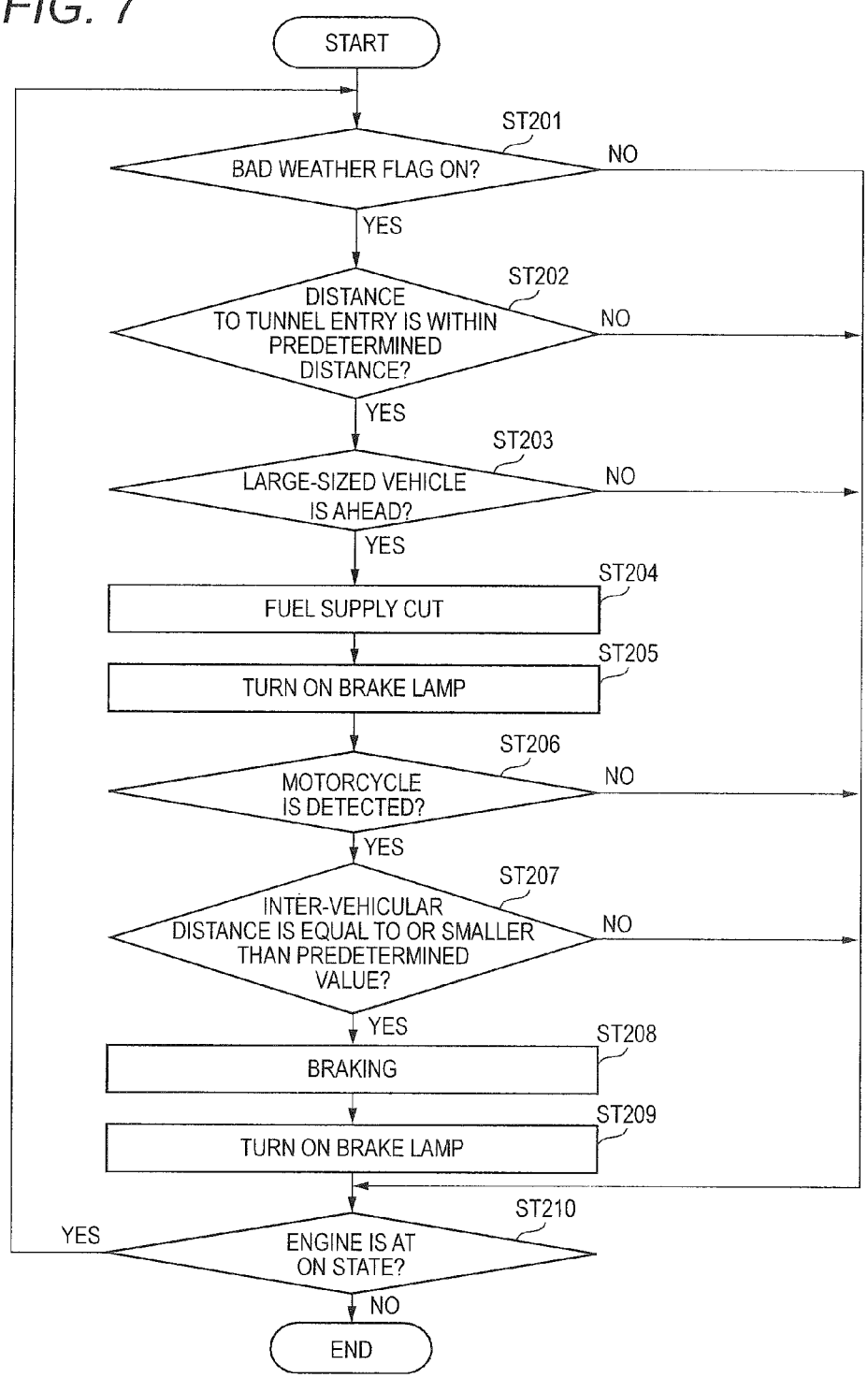
FIG. 7 is a control flow of the driving assistance device in accordance with the illustrative embodiment.
Figure 8:
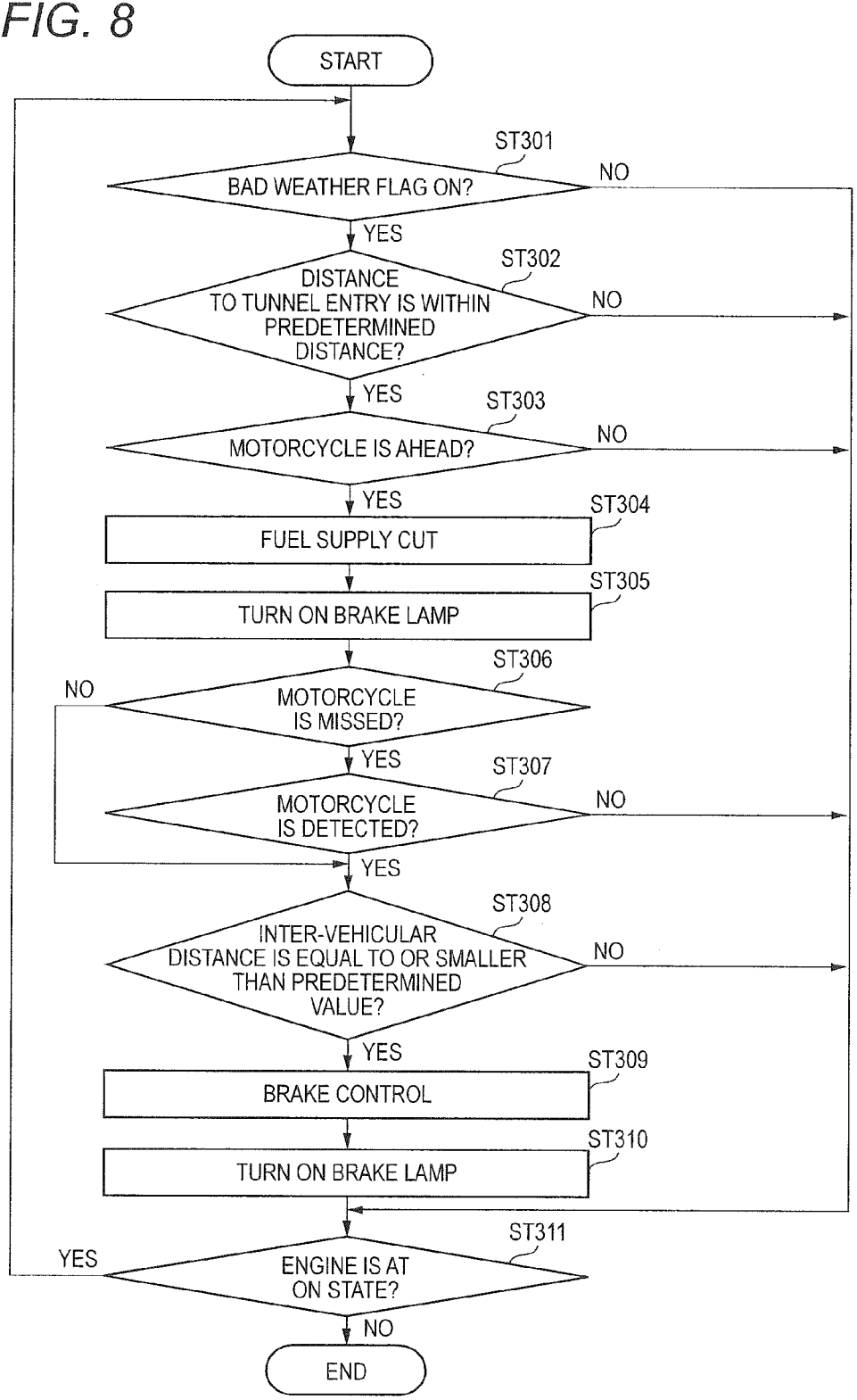
FIG. 8 is a control flow of the driving assistance device in accordance with the illustrative embodiment.

Subsequently, a control flow of the driving assistance device of the illustrative embodiment is described. FIGS. 6 to 8 depict a control flow of the driving assistance device of the illustrative embodiment.

First, the determination of the bad weather is described. As shown in FIG. 6, the speed reduction control assistance unit 101 (refer to FIG. 5) determines whether the subject vehicle 1 is in the tunnel 3 (refer to FIGS. 1A, 1B, 2A and 2B) (ST101). This determination can be performed on the basis of the subject vehicle position information (for example, coordinates) input from the GPS reception unit 105 and the information (for example, coordinates of the tunnel 3 of the map data) about the tunnel-shaped road structure stored in the storage unit 104, for example. In addition, the speed reduction control assistance unit 101 can determine whether the subject vehicle is in the tunnel 3 by using the information from an external device such as a beacon, an RFID tag and the like, for example.

When a result of the determination in ST101 is YES, the speed reduction control assistance unit 101 returns to ST101. On the other hand, when a result of the determination in ST101 is NO, the speed reduction control assistance unit 101 determines whether an amount of raindrops attached on the front window and the like is equal to or greater than a threshold value, based on the output from the raindrop amount sensor 111 (ST102).

When a result of the determination in ST102 is YES, the speed reduction control assistance unit 101 sets a bad weather flag (which will be described later) stored in the storage unit 104 to ON (ST103) and proceeds to ST105. On the other hand, when a result of the determination in ST102 is NO, the speed reduction control assistance unit 101 sets the bad weather flag to OFF (ST104) and proceeds to ST105.

In ST105, the speed reduction control assistance unit 101 determines whether an engine is at an ON state, based on the output from the driving control unit 102. When a result of the determination in ST105 is YES, the speed reduction control assistance unit 101 returns to ST101 and repeats the determination as to the bad weather. When a result of the determination in ST105 is NO, the speed reduction control assistance unit 101 ends the processing.

Thereby, when the engine is at the ON state, the determination as to the bad weather is continuously performed, and when the engine is at an OFF state, the determination as to the bad weather is not performed. Also, when the subject vehicle 1 is in the tunnel 3, the rewriting of the bad weather flag is not performed.

Subsequently, processing that is to be performed by the speed reduction control assistance unit 101 in the vicinity of the entry of the tunnel 3 is described with reference to FIG. 7. First, the speed reduction control assistance unit 101 (refer to FIG. 5) determines whether the bad weather flag stored in the storage unit 104 is ON (ST201). When a result of the determination in ST201 is NO, the speed reduction control assistance unit 101 proceeds to ST210.

When a result of the determination in ST201 is YES, the speed reduction control assistance unit 101 determines whether a distance from the subject vehicle 1 to the entry of the tunnel 3 (refer to FIGS. 1A and 1B) is within the predetermined distance (ST202). This determination can be performed on the basis of the subject vehicle position information (for example, coordinates) input from the GPS reception unit 105 and the information (for example, coordinates of the tunnel 3 of the map data) about the tunnel-shaped road structure stored in the storage unit 104, for example. In the meantime, the predetermined distance has been described above.

When a result of the determination in ST202 is NO, the speed reduction control assistance unit 101 proceeds to ST210. On the other hand, when a result of the determination in ST202 is YES, the speed reduction control assistance unit 101 determines whether there is a large-sized vehicle in front of the subject vehicle 1 (ST203). This determination can be performed on the basis of the information of the size of the detection target included in the output from the millimeter wave radar 103 (refer to FIG. 5), for example. More specifically, when the size of the detection target is greater than a size of the saddle-ridden vehicle stored in the storage unit 104 and becoming a reference, the speed reduction control assistance unit 101 determines that there is a large-sized vehicle in front of the subject vehicle 1.

When a result of the determination in ST203 is NO, the speed reduction control assistance unit 101 proceeds to ST210. On the other hand, when a result of the determination in ST203 is YES, the speed reduction control assistance unit 101 outputs the determination result to the driving control unit 102, as the driving assistance information, and enables the driving control unit 102 to control the speed reduction unit 110 to perform the fuel supply cut, as the primary speed reduction control (ST204). Also, the speed reduction control assistance unit 101 enables the driving control unit 102 to control the notification unit 109 to turn on the brake lamp, for example (ST205).

Subsequently, the speed reduction control assistance unit 101 determines whether the millimeter wave radar 103 (refer to FIG. 5) has detected the motorcycle 4 (refer to FIGS. 1A and 1B) (ST206). This determination can be performed on the basis of the size of the detection target included in the output from the millimeter wave radar 103, for example. When a result of the determination in ST206 is NO, the speed reduction control assistance unit 101 proceeds to ST210. On the other hand, when a result of the determination in ST206 is YES, the speed reduction control assistance unit 101 determines whether the inter-vehicular distance between the subject vehicle 1 and the motorcycle 4 is equal to or smaller than the predetermined value (ST207). This determination is performed on the basis of the inter-vehicular distance output from the millimeter wave radar 103.

When a result of the determination in ST207 is NO, the speed reduction control assistance unit 101 proceeds to ST210. On the other hand, when a result of the determination in ST207 is YES, the speed reduction control assistance unit 101 outputs the determination result to the driving control unit 102, as the driving assistance information. Thereby, the speed reduction control assistance unit 101 enables the driving control unit 102 to control the speed reduction unit 110 to perform the brake control, as the secondary speed reduction control (ST208). As a result, the subject vehicle 1 (refer to FIGS. 1A and 1B) reduces the speed so as to avoid the contact with the motorcycle 4. Also, the speed reduction control assistance unit 101 enables the driving control unit 102 to control the notification unit 109 to turn on the brake lamp, for example (ST209).

Continuously to ST209 and when the results of the determinations in ST201 to ST203, ST206 and ST207 are NO, the speed reduction control assistance unit 101 determines whether the engine is at the ON state, based on the output from the driving control unit 102 (ST210). When a result of the determination in ST210 is YES, the speed reduction control assistance unit 101 returns to ST201. On the other hand, when a result of the determination in ST210 is NO, the speed reduction control assistance unit 101 ends the processing. Thereby, when the engine is at the ON state, the processing of ST201 to ST209 is continuously performed at the entry-side of the tunnel 3, and when the engine is at the OFF state, the processing is over.

Subsequently, processing that is to be performed by the speed reduction control assistance unit 101 in the vicinity of the exit of the tunnel 3 is described with reference to FIG. 8. The same processing as the processing of the speed reduction control assistance unit 101 in the vicinity of the entry of the tunnel 3, which has been described with reference to FIG. 7, are simply described.

First, the speed reduction control assistance unit 101 (refer to FIG. 5) determines whether the bad weather flag stored in the storage unit 104 is ON (ST301). When a result of the determination in ST301 is NO, the speed reduction control assistance unit 101 proceeds to ST311.

When a result of the determination in ST301 is YES, the speed reduction control assistance unit 101 determines whether a distance to the exit of the tunnel 3 (refer to FIGS. 2A and 2B) is within the predetermined distance (ST302).

When a result of the determination in ST302 is NO, the speed reduction control assistance unit 101 proceeds to ST311. On the other hand, when a result of the determination in ST302 is YES, the speed reduction control assistance unit 101 determines whether there is the motorcycle 4 (refer to FIGS. 2A and 2B) in front of the subject vehicle 1 (ST303).

When a result of the determination in ST303 is NO, the speed reduction control assistance unit 101 proceeds to ST311. On the other hand, when a result of the determination in ST303 is YES, the speed reduction control assistance unit 101 (refer to FIG. 5) outputs the determination result to the driving control unit 102, as the driving assistance information, and enables the driving control unit 102 to control the speed reduction unit 110 to perform the fuel supply cut, as the primary speed reduction control (ST304). Also, the speed reduction control assistance unit 101 enables the driving control unit 102 to control the notification unit 109 to turn on the brake lamp, for example (ST305).

Subsequently, the speed reduction control assistance unit 101 determines whether the millimeter wave radar 103 did not detect the motorcycle 4 (refer to FIGS. 2A and 2B), i.e., whether the motorcycle 4 is missed (ST306). When a result of the determination in ST306 is NO, the speed reduction control assistance unit 101 proceeds to ST308.

On the other hand, when a result of the determination in ST306 is YES, the speed reduction control assistance unit 101 determines whether the millimeter wave radar 103 has again detected the motorcycle 4 (ST307). That is, when the millimeter wave radar 103 cannot detect the motorcycle 4, which could be detected in the tunnel 3, due to the deterioration of the detection environments in the vicinity of the exit of the tunnel 3, the speed reduction control assistance unit 101 determines whether the motorcycle 4 can be again detected as the subject vehicle 1 gets out of the tunnel 3.

When a result of the determination in ST307 is NO, the speed reduction control assistance unit 101 proceeds to ST311. On the other hand, when a result of the determination in ST307 is YES, the speed reduction control assistance unit 101 determines whether the inter-vehicular distance between the subject vehicle 1 and the motorcycle 4 is equal to or smaller than the predetermined value (ST308). This determination is performed on the basis of the inter-vehicular distance output from the millimeter wave radar 103.

When a result of the determination in ST308 is NO, the speed reduction control assistance unit 101 proceeds to ST311. On the other hand, when a result of the determination in ST308 is YES, the speed reduction control assistance unit 101 outputs the determination result to the driving control unit 102, as the driving assistance information. Thereby, the speed reduction control assistance unit 101 enables the driving control unit 102 to control the speed reduction unit 110 to perform the brake control, as the secondary speed reduction control (ST309). As a result, the subject vehicle 1 (refer to FIGS. 2A and 2B) reduces the speed so as to avoid the contact with the motorcycle 4. Also, the speed reduction control assistance unit 101 enables the driving control unit 102 to control the notification unit 109 to turn on the brake lamp, for example (ST310).

Continuously to ST310 and when the results of the determinations in ST301 to ST303, ST307 and ST308 are NO, the speed reduction control assistance unit 101 determines whether the engine is at the ON state, based on the output from the driving control unit 102 (ST311). When a result of the determination in ST311 is YES, the speed reduction control assistance unit 101 returns to ST301. On the other hand, when a result of the determination in ST311 is NO, the speed reduction control assistance unit 101 ends the processing. Thereby, when the engine is at the ON state, the processing of ST301 to ST310 is continuously performed at the exit-side of the tunnel 3, and when the engine is at the OFF state, the processing is over.

In FIGS. 6 to 8, the sequence of the processing is simply exemplary and one skilled in the art can appropriately change the sequence of the processing. For example, the brake control of ST208 in FIG. 7 and the lighting of the brake lamp of ST209 in FIG. 7 may be performed in a reverse sequence and may be performed in parallel at the same time.

As described above, according to the illustrative embodiment, at the entry-side of the tunnel 3 (refer to FIGS. 1A and 1B), the fuel supply cut (ST204 in FIG. 7) is performed as the primary speed reduction control (the minor speed reduction processing), on condition that it is the bad weather (a result of the determination in ST201 of FIG. 7 is YES), the position of the subject vehicle 1 is ahead of the predetermined distance from the entry of the tunnel 3 (a result of the determination in ST202 of FIG. 7 is YES) and the large-sized vehicle is in front of the subject vehicle 1 (a result of the determination in ST203 of FIG. 7 is YES). Thereby, after the speed of the subject vehicle 1 is slightly reduced, when the subject vehicle 1 enters the tunnel 3, the detection environments by the millimeter wave radar 103 are improved and the motorcycle 4 is detected (a result of the determination in ST206 of FIG. 7 is YES), it is possible to avoid the rapid speed reduction, as compared to a configuration where the brake control is performed in one step without performing the primary speed reduction control. As a result, it is possible to improve the ride quality of the subject vehicle 1 and to reduce the bad influence on the following vehicle.

In the meantime, at the exit-side of the tunnel 3 (refer to FIGS. 2A and 2B), the fuel supply cut (ST304 in FIG. 8) is performed as the primary speed reduction control (the minor speed reduction processing), on condition that it is the bad weather (a result of the determination in ST301 of FIG. 8 is YES) before the subject vehicle enters the tunnel 3, the position of the subject vehicle is ahead of the predetermined distance to the exit of the tunnel 3 (a result of the determination in ST302 of FIG. 8 is YES) and the motorcycle 4 is in front of the subject vehicle 1 in the tunnel 3 (a result of the determination in ST303 of FIG. 8 is YES). Thereby, after the speed of the subject vehicle 1 is slightly reduced, when the subject vehicle 1 comes close to the exit of the tunnel 3, the detection environments by the millimeter wave radar 103 are deteriorated due to the bad weather and the motorcycle 4 is missed (a result of the determination in ST306 of FIG. 8 is YES) and is then detected (a result of the determination in ST307 of FIG. 8 is YES), it is possible to avoid the rapid speed reduction, as compared to a configuration where the brake control is performed in one step without performing the primary speed reduction control. As a result, it is possible to improve the ride quality of the subject vehicle 1 and to reduce the bad influence on the following vehicle.

Like this, according to the driving assistance device 100 (refer to FIG. 5) of the illustrative embodiment, when the overlooked motorcycle 4 is detected and when the motorcycle 4 temporarily missed is again detected in the vicinity of the gateway of the tunnel 3, it is possible to prevent the rapid speed reduction control of the subject vehicle 1. Thereby, it is possible to prevent the ride quality of the subject vehicle 1, which is an automatic driving vehicle, from being deteriorated. Also, it is possible to reduce the bad influence of the subject vehicle 1 on the following vehicle, thereby preventing the subject vehicle from becoming an origination of a traffic jam.

Also, in the illustrative embodiment, while performing the primary speed reduction control, the deceleration state of the subject vehicle 1 is notified to the following vehicle by the lighting (ST205 in FIG. 7, ST305 in FIG. 8) of the brake lamp, which is an example of the notification unit 109. Thereby, it is possible to get the attention of the following vehicle, so that it is possible to suppress the following vehicle from making a hard stop when the subject vehicle 1 performs the secondary speed reduction control. Therefore, it is possible to further reduce the bad influence on the following vehicle.

In the meantime, the disclosure is not limited to the illustrative embodiment and can be diversely changed and implemented. In the illustrative embodiment, the sizes, shapes and the like shown in the accompanying drawings are not limited thereto and can be appropriately changed within the scope in which the effects of the disclosure are to be accomplished. In addition, the illustrative embodiment can be appropriately changed and implemented without departing from the object of the disclosure.

For example, in the illustrative embodiment, only when it is determined in ST203 of FIG. 7 that the large-sized vehicle exists in front of the subject vehicle, the primary speed reduction control (ST204 in FIG. 7) is performed. However, the primary speed reduction control may be performed, irrespective of whether there is the large-sized vehicle.

Also, in the illustrative embodiment, the millimeter wave radar 103 (refer to FIG. 5) has been exemplified as the vehicle detection unit. However, the vehicle detection unit is not particularly limited, and a detection unit configured to use the reflected waves, such as an infrared radar, an ultrasonic radar and the like, and a camera such as a CCD camera, an infrared camera and the like can also be applied.

Also, in the illustrative embodiment, the tunnel 3 has been exemplified. However, the disclosure can also be applied to the other tunnel-shaped road structure, such as a space below an elevated bridge including a highway, a railroad and the like.

Also, in the illustrative embodiment, as the determination condition as to whether or not to perform the primary speed reduction control, the condition whether the subject vehicle 1 is positioned at the predetermined distance ahead of the entry or the exit of the tunnel 3 (refer to FIGS. 1A, 1B, 2A and 2B) is adopted (refer to ST202 in FIG. 7 and ST302 in FIG. 8). Instead, a determination condition whether a distance from the subject vehicle 1 to the entry or exit of the tunnel 3 is within a predetermined range may be adopted.

Herein, the predetermined range is a range from a predetermined position ahead of the entry of the tunnel 3 (refer to FIGS. 1A and 1B) to the entry of the tunnel 3, for example. In other words, when a predetermined distance is denoted with Xm and a front of the tunnel 3 is denoted with minus and an inner side of the tunnel 3 is denoted with plus on the basis of the entry of the tunnel 3 (which is a starting point (an origin)), the predetermined range is a range from −Xm to 0 m. In the meantime, the predetermined distance is the same as the illustrative embodiment. Also, only an arbitrary distance (Ym) from the entry of the tunnel 3 may be set to the range to the inner side, and a range from −Xm to +Ym may be set.

The above is the same as the exit-side of the tunnel 3. In this case, the predetermined range is a range from a predetermined position ahead of the exit of the tunnel 3 (refer to FIGS. 2A and 2B) to the exit of the tunnel 3, for example. In other words, when a predetermined distance is denoted with X'm and a front of the tunnel 3 (i.e., the inner side of the tunnel 3) is denoted with minus and an outer side of the tunnel 3 is denoted with plus on the basis of the exit of the tunnel 3 (which is a starting point (an origin)), the predetermined range is a range from −X'm to 0 m. Also, only an arbitrary distance (Y'm) from the exit of the tunnel 3 may be set to the range to the outer side, and a range from −X'm to +Y'm may be set.

As described above, the disclosure accomplishes the effects of preventing the subject vehicle from making a hard stop by the driving assistance device when the vehicle detection unit overlooks or temporarily misses the preceding vehicle due to the bad weather and the like and then again detects the preceding vehicle in the vicinity of the gateway of the tunnel-shaped structure, thereby improving the ride quality and reducing the bad influence on the following vehicle. In particular, the disclosure can be usefully applied to the driving assistance device of the automatic driving vehicle.

What is claimed is:

1. A driving assistance device configured to reduce a speed of a subject vehicle on the basis of an output of a vehicle detection unit which is configured to detect a preceding vehicle traveling in front of the subject vehicle and to measure an inter-vehicular distance between the subject vehicle and the preceding vehicle, the driving assistance device comprising:
    a speed reduction control unit configured to perform a speed reduction control for the subject vehicle; and a speed reduction control assistance unit configured to enable the speed reduction control unit to perform the speed reduction control, wherein when there is a possibility that weather in a surrounding of the subject vehicle influences a detection performance of the vehicle detection unit, the speed reduction control assistance unit enables the speed reduction control unit to perform a primary speed reduction control at a predetermined distance ahead of an entry or an exit of a tunnel-shaped road structure on the basis of information about a position of the subject vehicle and a road structure on a traveling road on which the subject vehicle travels, and thereafter, when the vehicle detection unit detects the preceding vehicle and the inter-vehicular distance is equal to or smaller than a predetermined value, the speed reduction control assistance unit enables the speed reduction control unit to perform a secondary speed reduction control.

2. The driving assistance device according to claim 1, wherein a control amount of the primary speed reduction control is less than a control amount of the secondary speed reduction control.

3. The driving assistance device according to claim 1, wherein the primary speed reduction control is fuel supply cut, and the secondary speed reduction control is a brake control.

4. The driving assistance device according to claim 1, wherein at a side of the entry of the tunnel-shaped road structure, the speed reduction control assistance unit enables the speed reduction control unit to perform the primary speed reduction control and the secondary speed reduction control when the vehicle detection unit detects a large-sized vehicle.

5. The driving assistance device according to claim 1, wherein at a side of the exit of the tunnel-shaped road structure, the speed reduction control assistance unit enables the speed reduction control unit to perform the primary speed reduction control and the secondary speed reduction control when the vehicle detection unit detects the preceding vehicle in the tunnel-shaped road structure.

6. The driving assistance device according to claim 1, further comprising a notification unit that notifies a deceleration state of the subject vehicle to a following vehicle traveling at the rear of the subject vehicle when the speed reduction control assistance unit enables the speed reduction control unit to perform the primary speed reduction control.

\* \* \* \* \*